No. 758,226. PATENTED APR. 26, 1904.
J. VINSON.
MOTOR.
APPLICATION FILED DEC. 24, 1903.
NO MODEL.
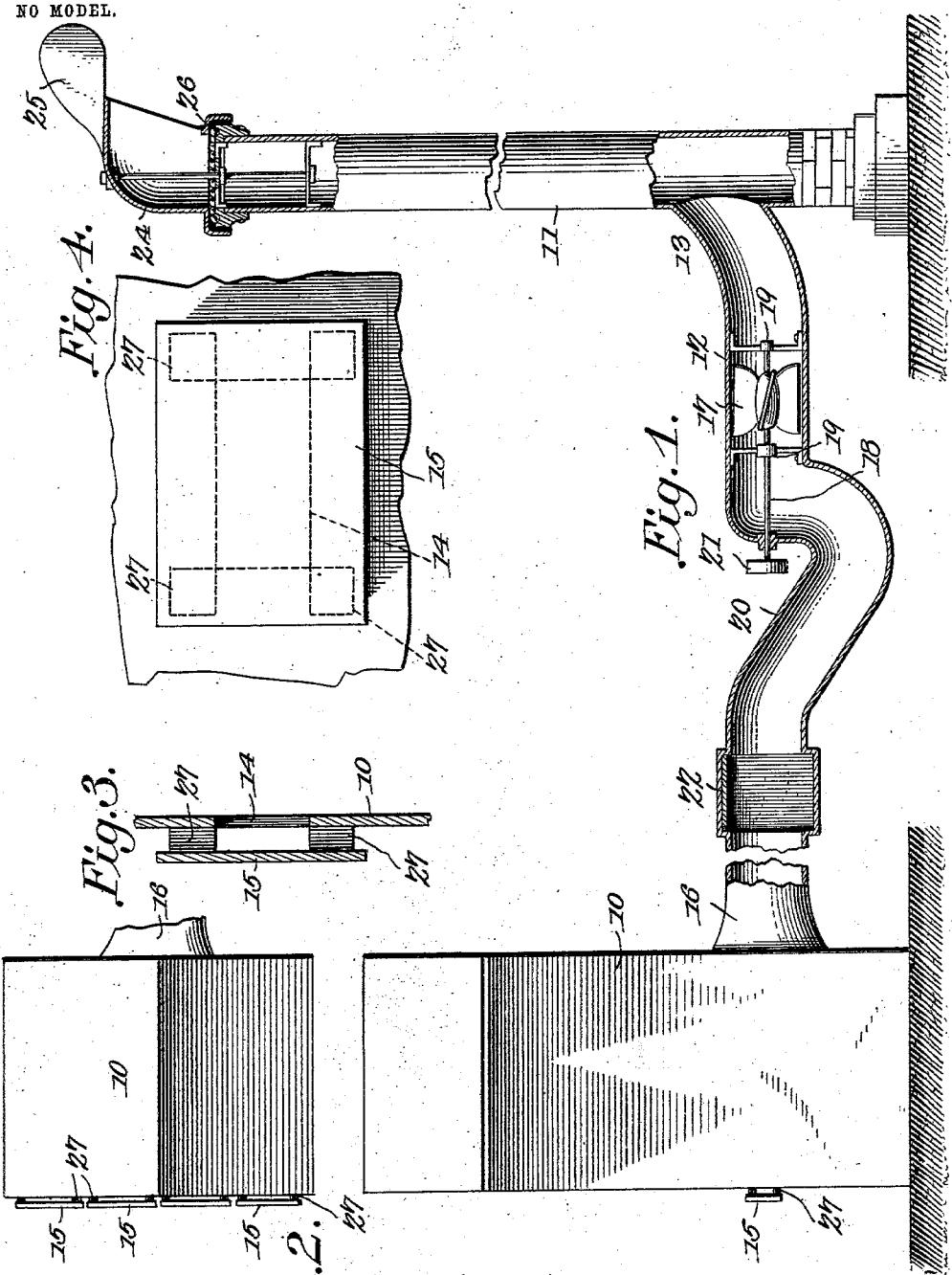
Witnesses
E. J. Stewart
C. H. Woodward
James Vinson, Inventor.
by C. A. Snow & Co.
Attorneys No. 758,226. Patented April 26, 1904.

UNITED STATES PATENT OFFICE.

JAMES VINSON, OF CREAL SPRINGS, ILLINOIS.

MOTOR.

SPECIFICATION forming part of Letters Patent No. 758,226, dated April 26, 1904.

Application filed December 24, 1903. Serial No. 186,467. (No model.)

*To all whom it may concern:*

Be it known that I, JAMES VINSON, a citizen of the United States, residing at Creal Springs, in the county of Williamson and State of Illinois, have invented a new and useful Motor, of which the following is a specification.

This invention relates to that class of motors wherein air in motion is employed as the motive power, and has for its object to utilize the constant natural currents of air flowing upwardly through vertical air shafts or flues; and the invention consists in certain novel features of construction whereby the desired results are attained, as hereinafter shown and described, and specified in the claims.

In the drawings illustrative of the invention, in which corresponding parts are denoted by like designating characters, Figure 1 is a sectional elevation of the improved apparatus. Fig. 2 is a plan view of a portion of the apparatus. Fig. 3 is an enlarged sectional detail of one of the intake-pipes and its guard-plate. Fig. 4 is a side view of the parts shown in Fig. 3.

The improved apparatus comprises an inclosed air-chamber 10 of any suitable size, a vertical air-shaft section 11, and a horizontal air-shaft section 12 between the air-chamber and the vertical section, the horizontal section curving, as at 13, where it unites with the vertical section, so that no abrupt corners or passage-ways exist from the chamber 10 to the discharge or upper end of the vertical section. The chamber 10 is provided with a plurality of inlet-openings 14, covered by laterally-extended guard-plates 15, spaced from the walls of the chamber 10, as by blocks 27, so that the air cannot blow directly through the openings to interfere with the action. The horizontal section 12 is flaring where it leaves the chamber 10, as at 16, to converge and confine the air-currents and increase their force as they pass to the shaft-section.

Disposed for rotation in the flue-section, preferably in the horizontal section 12, is a power-wheel constructed of screw-formed radiating-blades 17, mounted upon a shaft 18, which is in turn mounted longitudinally in the flue-section, as by bearings 19, the flue-section having a return-bend 20, so that one end of the shaft may project therethrough and be supplied with a drive-pulley 21, as shown. It will be obvious that by this arrangement the currents of air which constantly flow upwardly through a vertical air-shaft, such as illustrated herein, will be utilized to rapidly rotate the shaft 18 and drive-pulley 21 and by suitable transmitting means may be transmitted to any desired mechanical structure, and thus utilized for any useful purpose for which it is adapted.

A controlling gate or valve 22 is located in the air-shaft between the power-wheel and the chamber 10 to enable the air-currents to be cut off independently of the air-chamber, if preferred.

A "hood" 24 will preferably be rotatively mounted upon the outlet end of the vertical shaft-section 11 to prevent any adverse currents blowing downwardly into the air-shafts and interfering with the action of the power wheel. The hood will preferably be mounted upon ball-bearings 26 and provided with wind-vanes 25 to insure its proper position relative to the direction of the wind.

The air-shafts and other parts may be of any size, height, or length; but, generally speaking, the higher the vertical section 11 the greater the force of the air-currents, and consequently greater force, imparted to the power-wheel and its transmission mechanism. I do not, therefore, desire to be limited in any manner to the size or length of the air-shafts or to the size or capacity of the air-chamber, but reserve the right to construct the device of any desired size or modify the parts in other particulars and to make such alterations and changes as may fairly fall within the scope of the claims.

Having thus described the invention, what I claim is—

1. In a motor, a closed air-chamber having air-inlets provided with covering-shields spaced from the walls of the chamber, an air-shaft leading from said air-chamber and formed of a horizontal section and a vertical section, a power-wheel formed of radiating screw-formed blades and mounted for rotation in said air-shaft, and means for transmitting motion from said power-wheel.

2. In a motor, a closed air-chamber having air-inlets, an air-shaft formed of a horizontal section and a vertical section and leading from said air-chamber, a power-wheel formed of radiating screw-formed blades upon a shaft mounted for rotation in said air-shaft, projecting through the wall thereof and provided with a drive-pulley exteriorly thereof, said air-shaft having a return-bend opposite said pulley.

3. In a motor, a closed air-chamber having air-inlets provided with covering-shields spaced from the walls of the chamber, an air-shaft leading from said chamber and formed of a horizontal section and a vertical section, said horizontal section having a return-bend, a hood mounted revolubly at the upper end of the vertical section of the air-shaft, a power-wheel mounted for rotation in the horizontal section of the air-shaft between the vertical section of the latter and the return-bend, a shaft for said power-wheel extending through one wall of the return-bend, a power-pulley upon said shaft between the walls of the return-bend, and a controlling-valve between the return-bend and the air-chamber.

In testimony that I claim the foregoing as my own I have hereto affixed my signature in the presence of two witnesses.

JAMES VINSON.

Witnesses:
W. T. FREEZE,
G. W. CHISM.